United States Patent
Zbiral et al.

(10) Patent No.: US 12,107,294 B2
(45) Date of Patent: Oct. 1, 2024

(54) PRESSURE EQUALIZATION DEVICE, METHOD FOR PRESSURE EQUALIZATION AND HOUSING

(71) Applicant: MANN+HUMMEL GmbH, Ludwigsburg (DE)

(72) Inventors: Robert Zbiral, Marbach (DE); Thomas Jessberger, Asperg (DE); Juergen Kosicki, Erligheim (DE); Robert Kusebauch, Landau (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 17 days.

(21) Appl. No.: 18/320,985

(22) Filed: May 21, 2023

(65) Prior Publication Data

US 2023/0291067 A1 Sep. 14, 2023

Related U.S. Application Data

(63) Continuation of application No. PCT/EP2021/081683, filed on Nov. 15, 2021.

(30) Foreign Application Priority Data

Nov. 30, 2020 (DE) .......................... 102020131594.5

(51) Int. Cl.
*H01M 50/342* (2021.01)
*F16K 17/04* (2006.01)
(Continued)

(52) U.S. Cl.
CPC ..... *H01M 50/3425* (2021.01); *F16K 17/0413* (2013.01); *F16K 17/048* (2013.01);
(Continued)

(58) Field of Classification Search
CPC .......... H01M 50/3425; H01M 50/317; H01M 50/333; H01M 50/375; H01M 50/308;
(Continued)

(56) References Cited

U.S. PATENT DOCUMENTS

| 2,690,466 A | * | 9/1954 | Kendall | .............. H01M 50/308 429/53 |
| 4,091,180 A | * | 5/1978 | Fox | ..................... H01M 50/308 429/84 |

(Continued)

FOREIGN PATENT DOCUMENTS

| DE | 102011109243 A1 | 2/2013 |
| EP | 3636333 A1 | 4/2020 |
| EP | 3644402 A1 | 4/2020 |

*Primary Examiner* — Minh Q Le

(57) ABSTRACT

A pressure equalization device for a housing has a base body and a closure element with a flow path between them being open in a normal operating state of the pressure equalization device. A flow opening in the flow path is spanned by a membrane. An emergency venting spike projects from the closure element toward the membrane. The pressure equalization device transitions after emergency venting into an emergency operating state in which the closure element gas-tightly closes the base body. A housing with such a pressure equalization device is provided. In a method for pressure equalization with such a pressure equalization device between a housing interior and an environment, gas exchange between interior and environment is performed through the membrane and the flow path between closure element and base body. During emergency venting, the membrane is destroyed by the emergency venting spike. The closure element then closes the base body.

13 Claims, 14 Drawing Sheets

(51) Int. Cl.
*F16K 17/40* (2006.01)
*H01M 50/308* (2021.01)
*H01M 50/317* (2021.01)
*H01M 50/333* (2021.01)
*H01M 50/375* (2021.01)

(52) U.S. Cl.
CPC ......... *F16K 17/403* (2013.01); *H01M 50/308* (2021.01); *H01M 50/317* (2021.01); *H01M 50/333* (2021.01); *H01M 50/375* (2021.01); *Y02E 60/10* (2013.01)

(58) Field of Classification Search
CPC .. F16K 17/0413; F16K 17/048; F16K 17/403; Y02E 60/10
USPC ........ 137/68.3, 68.11, 68.12, 71, 72, 75, 76, 137/260, 461, 511, 847, 457, 386
See application file for complete search history.

(56) References Cited

U.S. PATENT DOCUMENTS

| | | | | |
|---|---|---|---|---|
| 5,407,760 | A * | 4/1995 | Kasner | H01M 50/333 |
| | | | | 429/89 |
| 5,821,008 | A * | 10/1998 | Harada | H01M 50/578 |
| | | | | 429/61 |
| 6,051,332 | A * | 4/2000 | Verhoog | H01M 50/308 |
| | | | | 429/57 |
| 6,555,263 | B1 * | 4/2003 | Kim | H01M 50/3425 |
| | | | | 429/57 |
| 6,632,559 | B1 * | 10/2003 | Kawamura | H01M 50/3425 |
| | | | | 429/61 |
| 9,806,310 | B1 * | 10/2017 | Pounds | H01M 10/613 |
| 10,128,476 | B2 | 11/2018 | Umeyama et al. | |
| 10,557,561 | B2 | 2/2020 | Kleinke et al. | |
| 2004/0238031 | A1 | 12/2004 | Lee | |
| 2013/0032219 | A1 | 2/2013 | Heim et al. | |
| 2013/0098912 | A1 | 4/2013 | Scagliarini et al. | |
| 2016/0036025 | A1 | 2/2016 | Hofer | |
| 2017/0018748 | A1 * | 1/2017 | Matsuura | H01M 50/317 |
| 2017/0098807 | A1 * | 4/2017 | Umeyama | H01M 50/325 |
| 2017/0244082 | A1 | 8/2017 | Ahn et al. | |
| 2018/0097214 | A1 * | 4/2018 | Ogawa | H01M 50/394 |
| 2018/0219200 | A1 * | 8/2018 | Albukrek | H01M 50/333 |
| 2018/0261814 | A1 | 9/2018 | Zacher | |
| 2021/0127511 | A1 * | 4/2021 | Schulz | F16K 17/048 |
| 2021/0320375 | A1 | 10/2021 | Zbiral et al. | |
| 2024/0047815 | A1 * | 2/2024 | Rink | H01M 50/3425 |

* cited by examiner

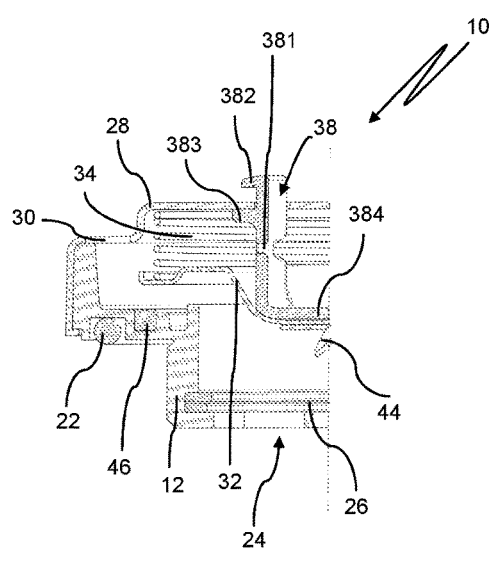 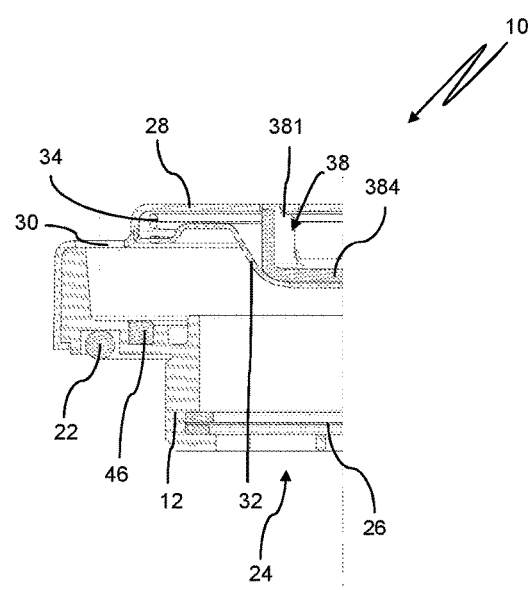
Fig. 11a                    Fig. 11b

PRESSURE EQUALIZATION DEVICE, METHOD FOR PRESSURE EQUALIZATION AND HOUSING

CROSS-REFERENCE TO RELATED APPLICATIONS

This application is a continuation application of International Application No. PCT/EP2021/081683 filed on Nov. 15, 2021, which claims the benefit of German Application No. 102020131594.5 filed on Nov. 30, 2020, the entire disclosures of which are incorporated herein by reference for all purposes.

BACKGROUND

The invention concerns a pressure equalization device for a housing, in particular for a battery housing, with a base body which can be flowed through and a closure element. The invention concerns furthermore a method for pressure equalization between an interior of a housing, in particular of a battery housing, and an environment, as well as the housing itself.

Housings, such as, for example, battery housings, are frequently provided with a pressure equalization device in order to enable a pressure equalization between an interior of the housing and an environment. If the housing were hermetically sealed, pressure differences between the interior and the environment could build up in operation of the housing or of a device arranged in the housing, for example, an electrochemical energy storage device. In that the pressure equalization device enables a pressure equalization, it is avoided that the housing fails mechanically in operation, for example, in that the housing bulges to the interior or exterior and bursts in the end.

In batteries or rechargeable batteries, in particular in high-voltage stores as they are used as traction batteries of electric vehicles, a failure of the battery cells can occur which leads to a strong pressure and temperature increase in the interior of the housing. In order to avoid bursting of the housing, the hot gas which is under high pressure must be quickly discharged from the interior of the housing into the environment.

DE 102017003360 B3 discloses a pressure equalization device for a housing which comprises a grid-shaped cage with a gas passage opening which is covered by a gas-permeable membrane. A pressure relief valve in the form of an umbrella as a burst protection is provided parallel to the gas passage opening with respect to fluid flow.

WO 2020/141044 A1 describes a venting unit for an electronics housing which comprises a base body connectable fluid-tightly to a rim of a pressure equalization opening of the electronics housing and comprising at least one gas passage opening which is covered by a membrane in a normal operating state of the venting unit. The membrane is fastened fluid-tightly on a membrane carrier which is moveable relative to the base body and which is seal-tightly pressed against a rim of the gas passage opening of the base body by an axial force in the normal operating state so that the membrane carrier, when a predetermined pressure difference between an interior and an environment is surpassed, can be lifted off the base body to release an emergency venting opening surrounding the membrane.

After an emergency venting process, the two aforementioned pressure equalization devices or venting units transition again into their normal operating state in that the pressure relief valve closes or the membrane carrier is pressed against the rim. A gas exchange between the environment and the interior is therefore still possible through the gas passage opening. When the emergency venting process occurred due to a battery cell defect, oxygen from the environment can therefore reach the interior of the housing. This can promote the onset or the spreading of a fire of a defective battery.

U.S. Pat. No. 10,128,476 B2 discloses a sealed battery housing with a valve. The valve is in a closed state when an inner pressure in the battery housing is smaller than a first pressure; in an open state when the inner pressure is at least as large as the first pressure and smaller than a second pressure; and in a closed state when the inner pressure is at least as large as the second pressure. In case that the inner pressure surpasses a third pressure, additional current-interrupting valves are provided at the anode and the cathode.

It is an object of the invention to improve the operational safety of batteries in vented housings.

SUMMARY

The object is solved by a pressure equalization device for a housing, in particular for a battery housing, with a base body which can be flowed through and a closure element, wherein a flow path between the base body and the closure element is open in a normal operating state and a flow opening positioned in the flow path in the base body is spanned by a membrane, and wherein the pressure equalization device is configured to transition after an emergency venting event into an emergency operating state in which the closure element gas-tightly closes the base body, wherein an emergency venting spike projects away from the closure element in a direction oriented toward the membrane.

The object is further solved by a method for pressure equalization between an interior of a housing, in particular of a battery housing, and an environment, with the steps:
performing a gas exchange between the interior of the housing and the environment through the membrane and through between the closure element and the base body;
performing an emergency venting process, wherein the membrane is destroyed by the emergency venting spike projecting away from the closure element of the pressure equalization device;
closing the base body by the closure element.

Preferred embodiments and variants are disclosed in the respective dependent claims and the description.

Pressure Equalization Device According to the Invention

According to the invention, a pressure equalization device for a housing, in particular for a battery housing, is provided. The pressure equalization device is typically configured to be inserted into a housing wall of the housing. The pressure equalization device comprises a base body which can be flowed through and a closure element. The base body can be one piece or of a multi-part configuration. Preferably, the base body is provided with a thread or a bayonet for screwing into the housing wall.

According to the invention, a flow path between the base body and the closure element is open in a normal operating state. In other words, the closure element does not close seal-tightly the base body which in itself can be flowed through in the normal operating state. Typically, a flow opening positioned in the flow path is spanned by a membrane in the base body. The membrane is preferably selectively permeable. In principle, the membrane is permeable for gases. The membrane is preferably impermeable for liquids and solids. Due to the membrane, an ingress of water into the housing can be prevented in the normal operating state. In the normal operating state, a (gas) flow through the base body can be realized along the flow path.

Further according to the invention, the pressure equalization device is configured to transition after an emergency venting process into an emergency operating state in which the closure element gas-tightly closes the base body. In other words, the closure element prevents flow through the base body and thus through the pressure equalization device in the emergency operating state. In that the closure element closes the base body in a flow-preventing way or seal-tightly, in particular an ingress of oxygen—be it in the form of molecular oxygen from the ambient air or in the form of gaseous or liquid water—through the pressure equalization device is prevented after completion of the emergency venting process. An emerging or already emerged fire in the housing is therefore cut off from the supply of an oxidation agent required for combustion. The onset of the fire can therefore be prevented, or the emerged fire can be extinguished.

In other words, the pressure equalization device according to the invention comprises a valve arrangement connected in series with the flow opening and formed with the closure element. In the normal operating state, the valve arrangement is open, i.e., can be flowed through. During an emergency venting process, the valve arrangement is open also. In the emergency operating state which is automatically established by the pressure equalization device according to the invention after completion of the emergency venting process, the valve arrangement cannot be flowed through. In the emergency operating state, the base body is seal-tightly closed by the closure element.

The emergency venting process can be characterized by a large volume flow, a high pressure, and/or a high temperature of the outflowing gas. The membrane can be destroyed in the emergency venting process. Since the closure element seal-tightly closes the base body after completion of the emergency venting process, there is still no danger that gases, liquids or solids can pass into the housing.

The pressure equalization device according to the invention enables the performance of a method according to the invention for pressure equalization as described below.

Preferably, the closure element is pretensioned against the base body. In this way, the sealing action of the base body in the emergency operating state by the closure element can be ensured particularly reliably. In order to pretension the closure element against the base body, a spring element can be provided. The spring element can be a coil spring, preferably a cylindrical one. The spring element can be supported at a cover of the pressure equalization device. The cover is typically held at the base body. The cover comprises at least one venting opening. Such a cover can also be provided when the pressure equalization device comprises no spring element.

Preferably, the closure element rests in the normal operating state on projections between which the flow path extends. Recesses that are formed between the projections enable thus a gas flow past the closure element. In particular, the projections are present at the base body and extend with at least one axial component from a side of the base body facing the closure element.

In a preferred embodiment of the pressure equalization device, the closure element is spaced apart at least regionally from the base body by a spacer in the normal operating state. The aforementioned projections and recesses can be formed at the spacer. The spacer can be designed or arranged at the base body such that it loses its effect in case of an emergency venting process so that the closure element can reach a seal-tight contact at the base body in the emergency operating state.

In an also preferred embodiment, the spacer is held with one end at the cover and with the other end at the closure element. Here, particularly gluing, welding under plasma treatment, injection molding as well as screws and/or rivets are conceivable.

In an advantageous embodiment, the spacer is held at the cover such that a reliable connection and thus a good flow passage is ensured in normal operation, wherein the closure element is axially moveable in a direction facing away from the membrane, which leads to an enlargement of the flow gap. The spacer is connected to the closure element in a manner such that it is fixedly secured in a normal operating state at temperatures of below 100° C., but loses its adherence at temperatures occurring in an emergency opening situation, for example, higher than 200° C. This is possible by a suitable selection of the plastic material and/or of an adhesive which loses its function at correspondingly high temperatures.

Furthermore, the spacer can be axially moveable together with the closure element when transferring the pressure equalization device into the emergency operating state.

As an alternative, extending between its closure element end proximal to the closure element and its end proximal to the cover, the spacer can comprise a force transmitting structure which comprises at least one rated break point which is configured to fail at a predetermined pressure load. In particular, the force transmitting structure comprises at least one radial protrusion which is formed as an axial stop which can contact an inner surface of the cover in the emergency operating state.

The rated break points can be reliably designed for a predetermined failure pressure force with conventional methods of strength simulation.

This embodiment has the advantage that the spacer is present outside of the closure element (in relation to the predetermined mounting direction) so that individual components of the spacer which are produced by the irreversible destruction thereof cannot pass into an interior of the housing, in particular battery housing, at which the pressure equalization device is mounted, which interior is freely accessible after the emergency venting event due to destruction of the membrane.

In yet another embodiment, the spacer can have a sleeve shape and preferably comprise a plurality of rated break points distributed about its circumference.

Particularly preferred, the spacer comprises a material which loses its shape stability at a temperature of at most 250° C., preferably at most 200° C., particularly preferred at most 150° C. Preferably, the spacer is comprised of such a material. The aforementioned temperatures can characterize in particular a softening temperature or a melting temperature. In this way, it can be achieved in a simple manner that, in case of an emergency venting process in which hot gases flow out of the interior of the housing, the spacer loses its strength at least to such an extent or is deformed so strongly that it is no longer capable of spacing apart the closure element from the base body.

In a further advantageous embodiment of the pressure equalization device, the closure element is embodied with a bistable spring body. In the normal operating state, the closure element is in a normal operating configuration. In the normal operating configuration, the closure element is formed and oriented such that it is not capable of seal-tightly closing the base body. Instead, the flow path remains open in the normal operating configuration. The bistable closure element is configured to transition into an emergency operating configuration in case of an emergency venting process under the pressure and/or temperature effect of the gas flowing out from the interior of the housing. In the emergency operating configuration, the closure element is formed and oriented such that—after completion of the emergency venting process—it is capable of seal-tightly closing the base body.

Particularly preferred, the closure element is curved in the normal operating configuration toward the flow opening. In the emergency operating configuration, the closure element can be curved away from the flow opening. The closure element can be configured plate-shaped for this purpose. The transition between the normal operating configuration and the emergency operating configuration in this embodiment can be realized in a simple manner by inverting the closure element under the pressure action of the outflowing gas. The configuration change can be facilitated by softening of the material of the closure element under the effect of the temperature of the outflowing gas.

In the emergency operating state, the closure element of the pressure equalization device according to the invention can contact continuously circumferentially the base body in order to close it seal-tightly. For this purpose, the base body can comprise a seal element which is held in a groove, for example. By means of the seal element, the base body can be sealed particularly reliably in the emergency operating state. The seal element is preferably arranged in a shielded flow zone of a holding structure, for example, a groove wall. A damage of the seal element by hot gas flowing through the pressure equalization device in case of an emergency venting process can therefore be avoided.

The pressure equalization device comprises an emergency venting spike. The emergency venting spike projects from the closure element toward the membrane. In case of an emergency venting process, the membrane is deflected due to the strong and fast pressure increase in the interior of the housing toward the emergency venting spike and is destroyed by it. Due to the destruction of the membrane, the flow resistance of the pressure equalization device is reduced so that the emergency venting process can occur particularly quickly.

Housing According to the Invention

The scope of the present invention encompasses furthermore a housing, in particular a battery housing, with a pressure equalization device according to the invention. The pressure equalization device is typically arranged at a housing wall of the housing. The base body is typically held at the housing wall. The housing wall can comprise a through passage in which the base body can be inserted. In particular, it can be provided that the base body projects through the housing wall. Preferably, electrochemical energy storage cells are arranged in the battery housing. Thus, the invention also concerns a battery. The energy storage cells can be lithium ion cells.

Pressure Equalization Method According to the Invention

Furthermore, the scope of the present invention encompasses a method for pressure equalization between an interior of a housing, in particular a battery housing, and an environment of the housing. The housing comprises a pressure equalization device as described above. The housing is therefore a housing according to the invention as described above.

In a first step of the method, a gas exchange between the interior of the housing and the environment is performed. The gas exchange is realized through the membrane and through between the closure element and the base body. In other words, the gas flows for pressure equalization along the flow path open in the normal operating state of the pressure equalization device between the closure element and the base body.

In a second step, an emergency venting process is performed. In the emergency venting process, in particular hot gas at high pressure with a large volume flow can escape from the interior of the housing into the environment. In the emergency venting process, the membrane is destroyed by the emergency venting spike which projects away from the closure element of the pressure equalization device. In this way, the escape of the gas from the interior can be facilitated.

In a third step, the base body is closed by the closure element. In other words, the pressure equalization device transitions into the emergency operating state. Due to the seal-tight closure of the base body, it can be prevented that gases and/or liquids, in particular oxygen-containing gases or liquids, flow into the housing. When the emergency venting process was caused by a defect of electrochemical energy storage cells arranged in the housing, sealing of the housing can counteract the onset of a fire or an already existing fire can be extinguished.

When the closure element is pretensioned against the base body, the closure element can be lifted off the base body in the emergency venting process. This can be realized opposite to the effect of a spring element which pretensions the closure element. In that the closure element is lifted off the base body farther, a particularly large cross section that can be flowed through can be released in order to facilitate the emergency venting process.

When the closure element is spaced apart by a spacer from the base body in the normal operating state, the spacer or the connection of the spacer to the closure element can be destroyed during the emergency venting process. In this way, the spacer loses its effect so that the closure element can seal-tightly contact the base body after completion of the emergency venting process. A destruction of the spacer or of the connection of the spacer to the closure element is understood insofar in particular such that it loses its shape and/or strength at least to such an extent that it is no longer capable of holding the closure element at a spacing from the base body. Preferably, the spacer is melted during the emergency venting process. The melted material of the spacer can be blown out from the pressure equalization device by the outflowing gas.

When the closure element is a bistable spring body, the closure element can be transferred from a normal operating configuration into an emergency operating configuration during execution of the emergency venting process. For this purpose, the closure element can be inverted under the effect of the flowing gas. Inverting can be realized particularly reliably when the closure element is curved toward the flow opening in the normal operating configuration and is curved away from the flow opening in the emergency operating configuration. Due to the inversion, more space is made available to the gas which is escaping from the flow opening. Due to the inversion of the closure element, a pressure peak can therefore be reduced in the emergency venting process. At the same time, the pressure peak which is occurring in the emergency venting process can affect the configurational change of the closure element. In the normal operating configuration, the closure element is formed and oriented such that it is not capable of closing seal-tightly the base body. Instead, the flow path remains open in the normal operating configuration. In the emergency operating configuration, the closure element is formed and oriented such that—after completion of the emergency venting process—it seal-tightly closes the base body in the emergency operating state.

BRIEF DESCRIPTION OF DRAWINGS

Further features and advantages of the invention result from the following detailed description of embodiments of the invention, from the claims as well as with the aid of the Figures of the drawing which show details according to the invention. The aforementioned and still to be described features can be realized individually by themselves or several combined in arbitrary expedient combinations in variants of the invention. The features illustrated in the drawing are illustrated such that the particularities according to the invention can be made clearly visible.

FIG. 4 shows a schematic flowchart of a method according to the invention for pressure equalization by use of the pressure equalization device of FIG. 1a.

FIG. 8 shows a schematic flowchart of a method according to the invention for pressure equalization by using the pressure equalization device of FIG. 5a.

FIG. 11a shows a detail view of the pressure equalization device of FIG. 10 in the normal operating state.

FIG. 11b shows a detail view of the pressure equalization device of FIG. 10 in the emergency venting state.

DETAILED DESCRIPTION

Figure 1A:
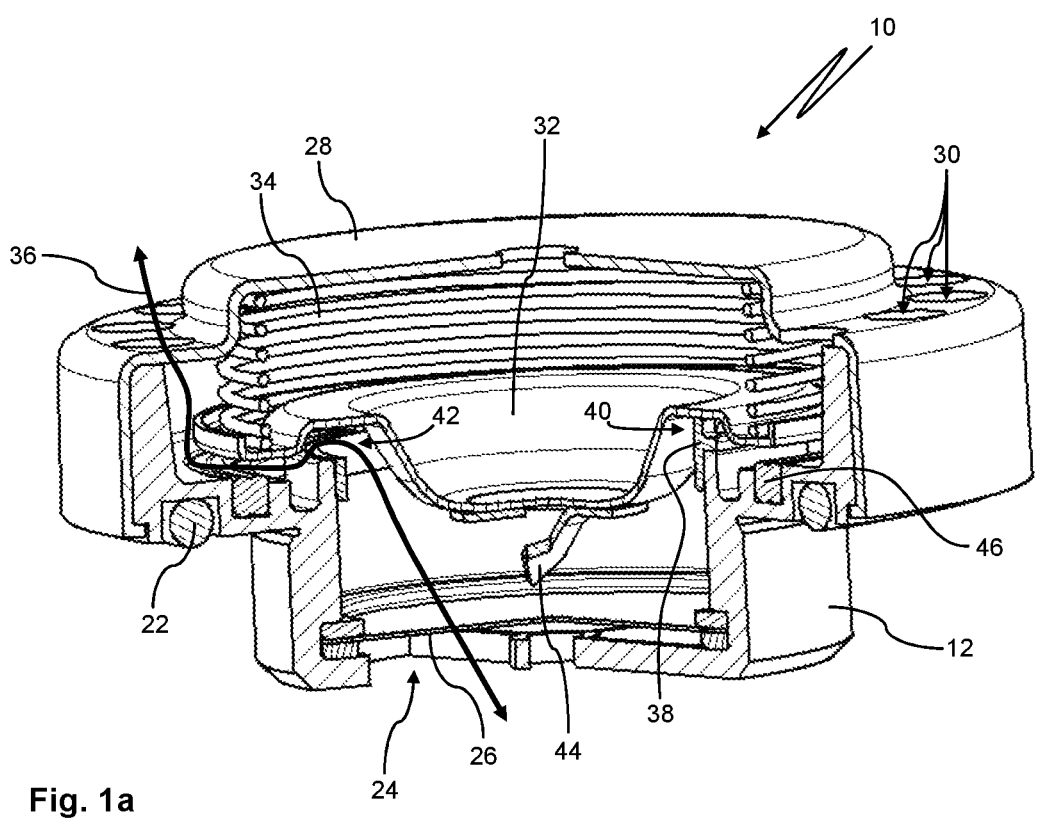
FIG. 1a shows, in a schematic section view, a pressure equalization device according to the invention with a base body which can be flowed through and against which a closure element is pretensioned, wherein a spacer keeps open a flow path between the base body and the closure element in a normal operating state.
Figure 1B:
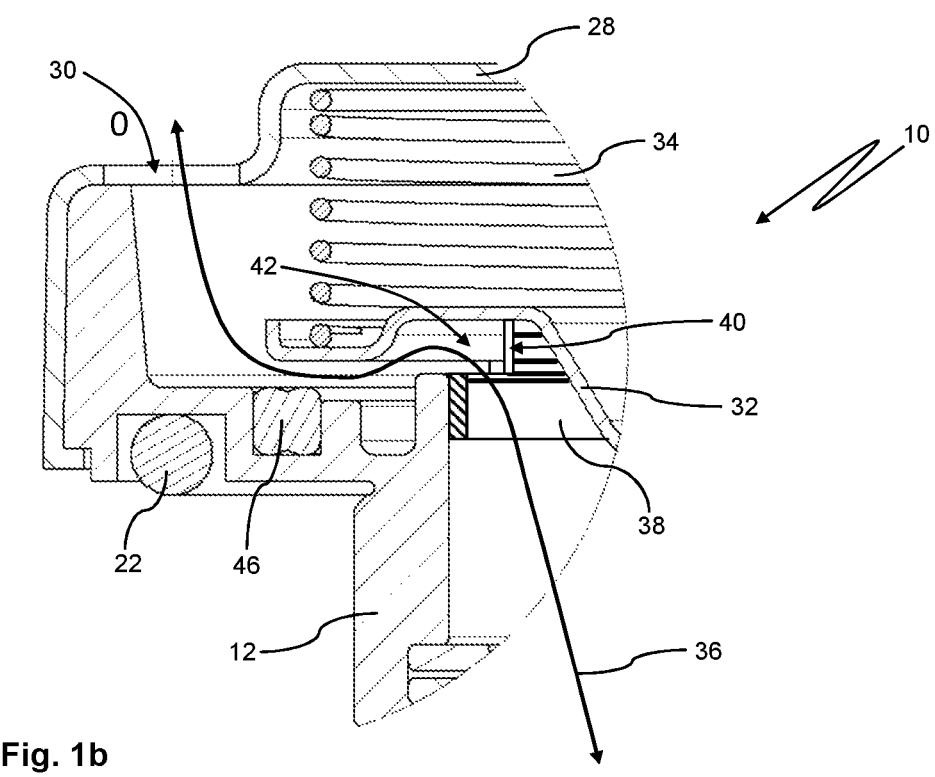
FIG. 1b shows the pressure equalization device of FIG. 1a in an enlarged detail section view.

FIG. 1a shows a pressure equalization device 10. In FIG. 1b, an enlarged detail of the pressure equalization device 10 is illustrated. The pressure equalization device 10 comprises a base body 12. Here, the base body 12 is of a one-part configuration. The pressure equalization device 10 serves for pressure equalization between an interior 14 and an environment 16 of a housing 18, compare FIG. 9. The base body 10 for this purpose can be inserted into a housing wall 20 of the housing 18. A seal 22 ensures that the gas exchange for pressure equalization occurs through the pressure equalization device 10 and not past it.

The base body 12 comprises a flow opening 24. The flow opening 24 is spanned by a selectively permeable membrane 26. The membrane 26 is permeable for gases. Liquids and solids are retained by the membrane 26. The flow opening 24 can be divided like a grid into several partial openings. The membrane 26 can rest on webs between the partial openings.

A cover 28 is held at the base body 10. The cover 28 comprises at least one venting opening 30, here a plurality of venting openings 30. The venting openings 30 can be distributed about a circumference of the cover 28.

The pressure equalization device 10 comprises a closure element 32. The closure element 32 is pretensioned by a spring element 34, here a coil spring, against the base body 12. The spring element 34 can be supported at the cover 28 for this purpose.

In FIGS. 1a and 1b, the pressure equalization device 10 is in a normal operating state. In the normal operating state, a flow path 36 is open between the closure element 32 and the base body 12. For a pressure equalization, air can flow along the flow path 36 through the flow opening 24 or the membrane 26, through between the closure element 32 and the base body 12, and through the venting openings 30 in the cover 28. In this manner, a gas exchange out of the housing 18 as well as out of the environment 16 into the housing 18 is possible.

In order to be able to hold the closure element 32 in the normal operating state spaced apart from the base body 12, a spacer 38 is provided. The spacer 38 is presently arranged at the base body 12. The spacer 38 comprises a plurality of projections 40. In the normal operating state, the closure element 32 contacts the projections 40. Recesses 42 are formed between the projections 40. The flow path 36 extends through the recesses 42.

Figure 2:
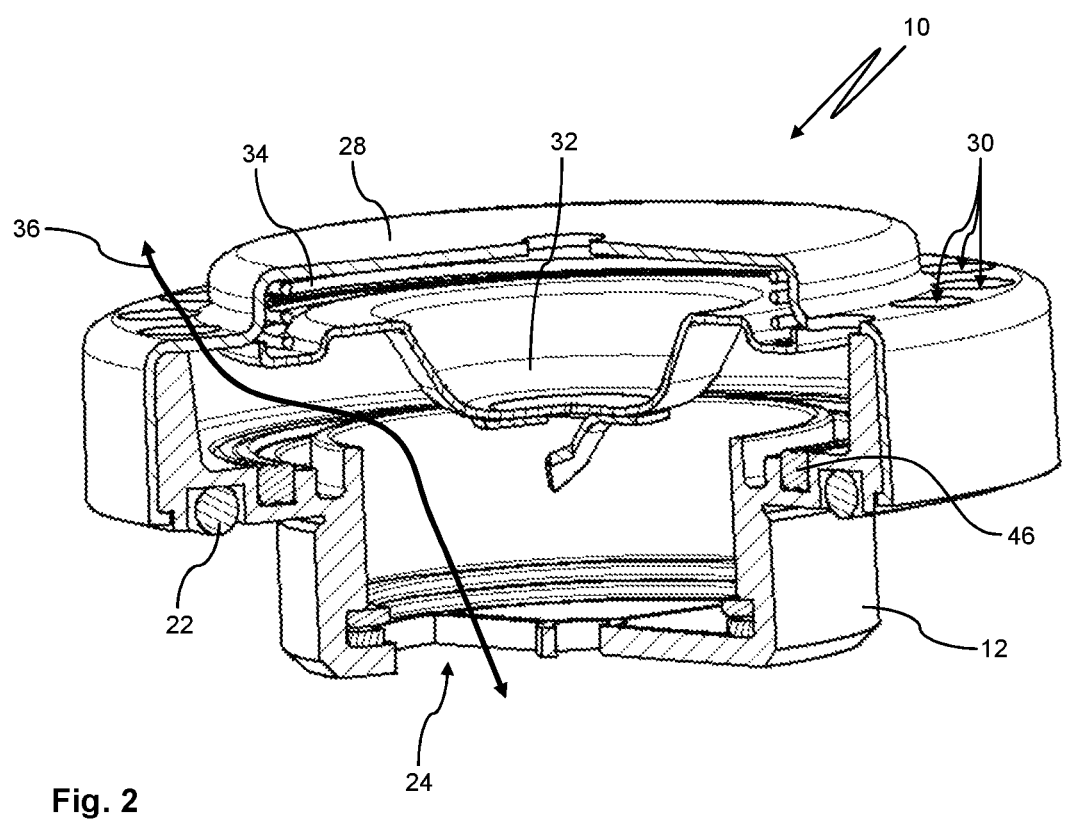
FIG. 2 shows, in a schematic section view, the pressure equalization device of FIG. 1a during an emergency venting process in which outflowing gas lifts the closure element against the action of a spring element farther off the base body and has removed the spacer.

FIG. 2 shows the pressure equalization device 10 during an emergency venting process. In the emergency venting process, hot gas flows under high pressure and with a large volume flow out of the housing 18. The closure element 32 is lifted in this way against the effect of the spring element 34 farther away from the base body 12. In this way, a large cross section which can be flowed through is released. This reduces the flow resistance of the pressure equalization device 10. The emergency venting process can therefore occur very quickly.

At the beginning of the emergency venting process, the membrane 26 (compare FIG. 1a) was deflected by the increasing pressure in the interior 14 of the housing 18 and pressed against an emergency venting spike 44. In this way, the membrane 26 was destroyed. This further reduces the flow resistance of the pressure equalization device 10. The emergency venting spike 44 projects here from the closure element 32 toward the membrane 26.

In the emergency venting process, the spacer 38 (compare FIGS. 1a and 1b) is destroyed. Here, the spacer 38 is comprised of a material, for example, a plastic material, which has a melting point of less than 200° C. Due to the hot gas flowing out from the housing 18, the spacer 38 is melted in the emergency venting process and removed from the base body 12.

Figure 3A:
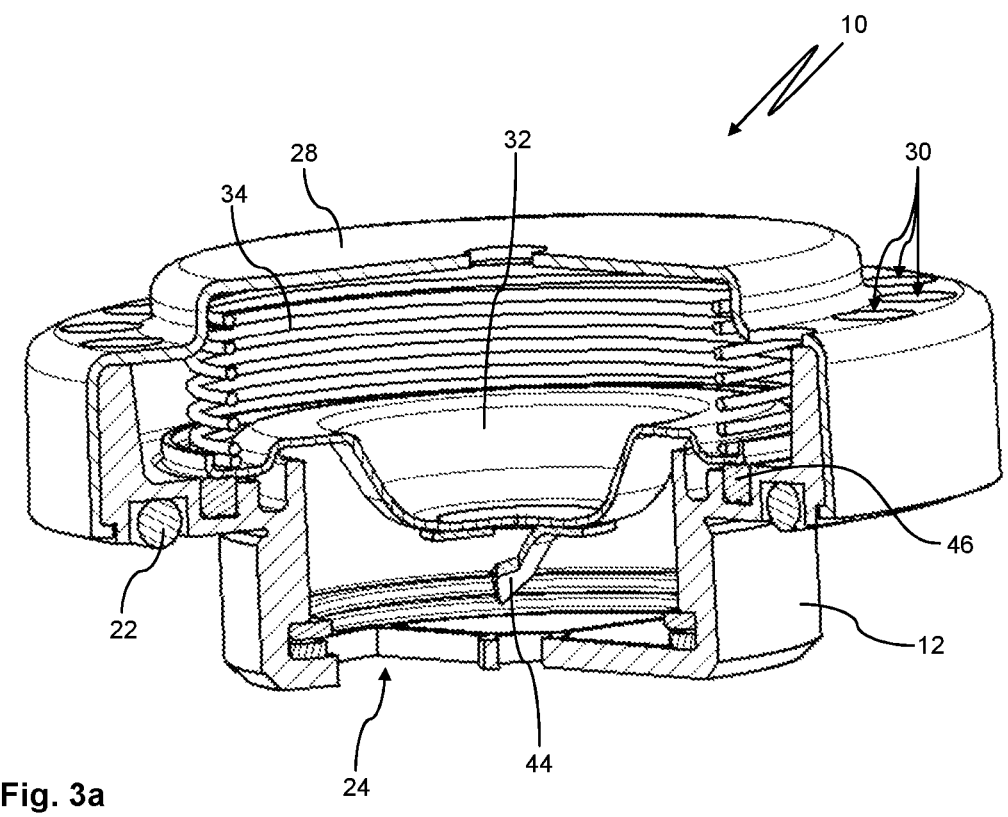
FIG. 3a shows, in a schematic section view, the pressure equalization device of FIG. 1a after completion of the emergency venting process in an emergency operating state, wherein the closure element is pushed by the spring element against the base body so that it closes the latter seal-tightly.
Figure 3B:
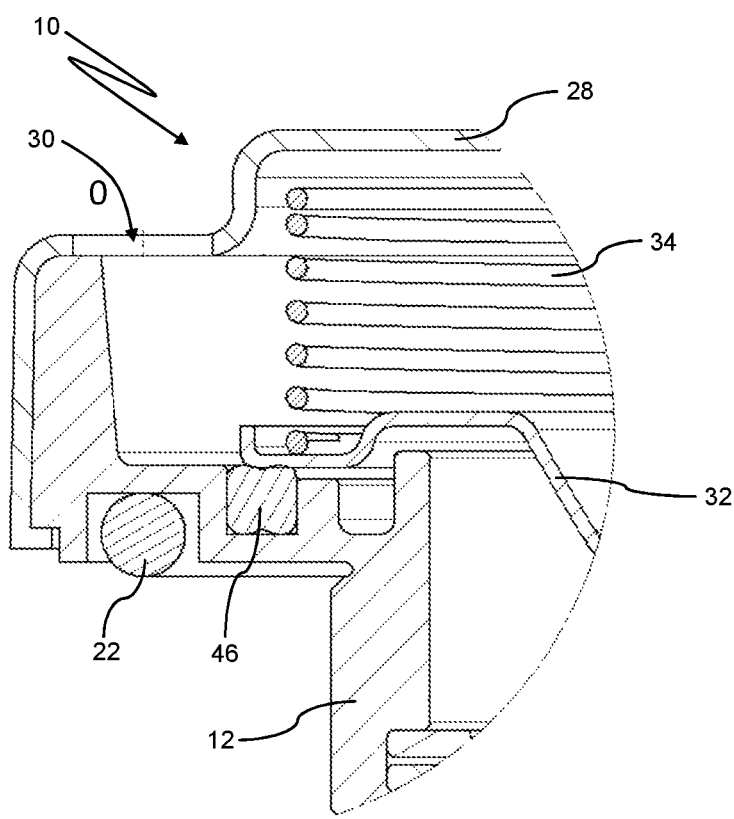
FIG. 3b shows the pressure equalization device of FIG. 3a in an enlarged detail section view.

FIGS. 3a and 3b show the pressure equalization device 10 after completion of the emergency venting process. The pressure equalization device 10 is now in an emergency operating state. After relief of the excess pressure in the interior 14 of the housing 18, the spring element 34 forces the closure element 32 against the base body 12. The closure element 32 closes seal-tightly the base body 12. For this purpose, the closure element 32 can contact continuously circumferentially a seal element 46 of the base body 12. An inflow of substances, in particular liquids or gases, from the environment 16 into the interior 14 of the housing 18 through the pressure equalization device 10 is no longer possible now. Also, outflow of gas from the interior 14 into the environment 16 is not possible as long as the pressure in the interior 14 is insufficient in order to lift the closure element 32 off the base body 12 against the force of the spring element 34. When the pressure in the interior 14 becomes large enough, a pressure equalization to the exterior is also possible in the emergency operating state in that the closure element 32 temporarily is lifted off the seal element 46.

Figure 4:
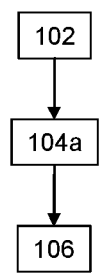

FIG. 4 shows a flowchart of the pressure equalization between the interior 14 of the housing 18 and the environment 16 by use of the afore described pressure equalization device 10.

In a step 102, a gas exchange between the interior 14 and the environment 16 occurs in a normal operating state, wherein gas flows through the flow opening 24 or the membrane 26, through the recesses 42 between the closure element 32 and the base body 12, and through the venting openings 30 in the cover 28 along the flow path 36, compare FIGS. 1a and 1b. In this manner, the pressure in the interior 14 of the housing 18 is equalized to the pressure of the environment 16. In this context, the flow can be oriented temporarily into the housing 18 and out of the housing 18, respectively.

In a step 104, an emergency venting process is performed. Due to a sudden pressure increase in the interior 14, the membrane 26 is deflected toward the closure element 32 and is destroyed by the emergency venting spike 44. Due to the hot gas which is flowing at high pressure out from the interior 14, the closure element 32 is lifted off the base body 12, compare FIG. 2. Moreover, the outflowing hot gas destroys the spacer 38 by melting it.

After relief of the excess pressure in the interior 14, the closure element 32 is pushed by the spring element 34 against the base body 12. The pressure equalization device 10 or its base body 12 is seal-tightly closed thereby in a step 106, compare FIGS. 3a and 3b, so that the emergency operating state is established. The flow path 36 (compare FIGS. 1a and 1b) is now blocked.

Figure 5A:
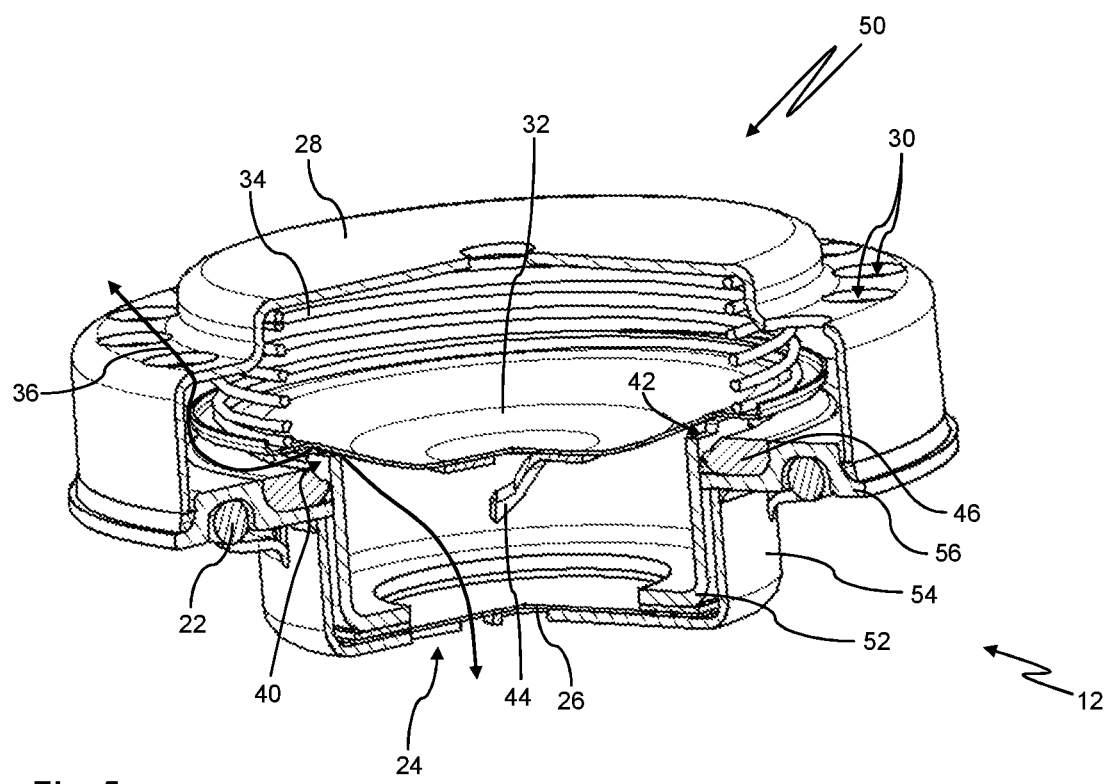
FIG. 5a shows, in a schematic section view, a further pressure equalization device according to the invention with a base body that can be flowed through and against which a bistable closure element is pretensioned, wherein a flow path between the base body and the closure element is open in a normal operating configuration of the closure element.
Figure 5B:
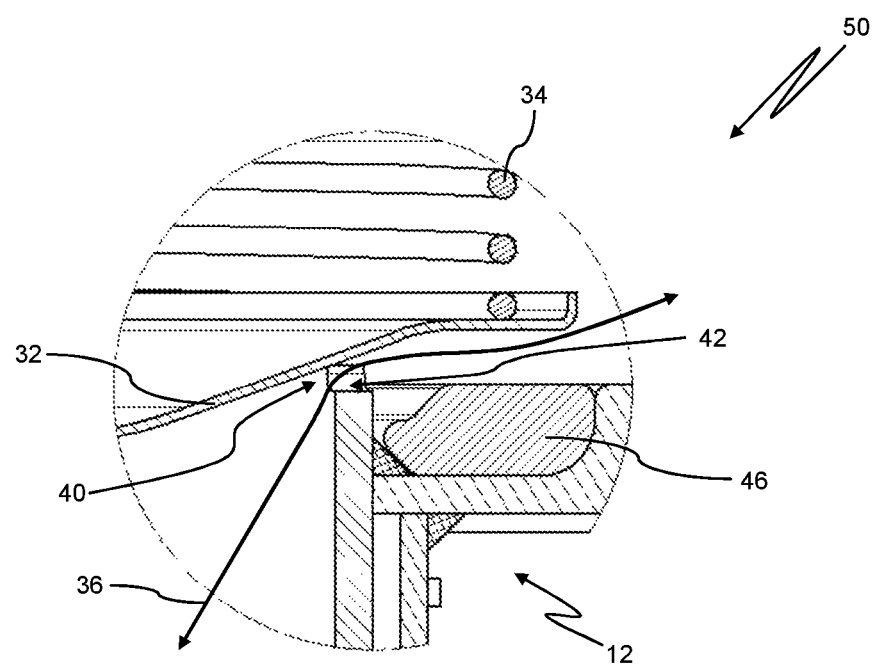
FIG. 5b shows the pressure equalization device of FIG. 5a in an enlarged detail section view.

FIGS. 5a and 5b show a further pressure equalization device 50 in the normal operating state. The pressure equalization device 50 is of a similar configuration as the above-described pressure equalization device 10 and serves the same purpose. In particular, the pressure equalization device 50 can be arranged in place of the pressure equalization device 10 at the housing 18 of FIG. 9. In the following, primarily the differences of the pressure equalization devices 50 in relation to the pressure equalization device 10 will be described; in other respects, reference is being had to the preceding description.

In the pressure equalization device 50, the closure element 32 is configured as a bistable spring body. For the normal operating state, the closure element 32 is in a normal operating configuration. The closure element 32 can be plate-shaped. Presently, the closure element 32 in the normal operating configuration is curved toward the flow opening 24 with the membrane 26.

The base body 12 of the pressure equalization device 50 is of a multi-part configuration. Presently, the base body 12 comprises an inner part 52, an outer part 54, and a holder part 56. It is understood that the pressure equalization device 50 could also be provided with a one-part base body 12; a multi-part base body 12 could also be provided in the pressure equalization device 10.

Projections 40 on which the closure element 32 is resting in the normal operating state are formed in the pressure equalization device 50 at the base body 12, here at its inner part 52. The flow path 36 along which the pressure equalization device 50 can be flowed through in the normal operating state extends through recesses 42 between the projections 40.

Figure 6:
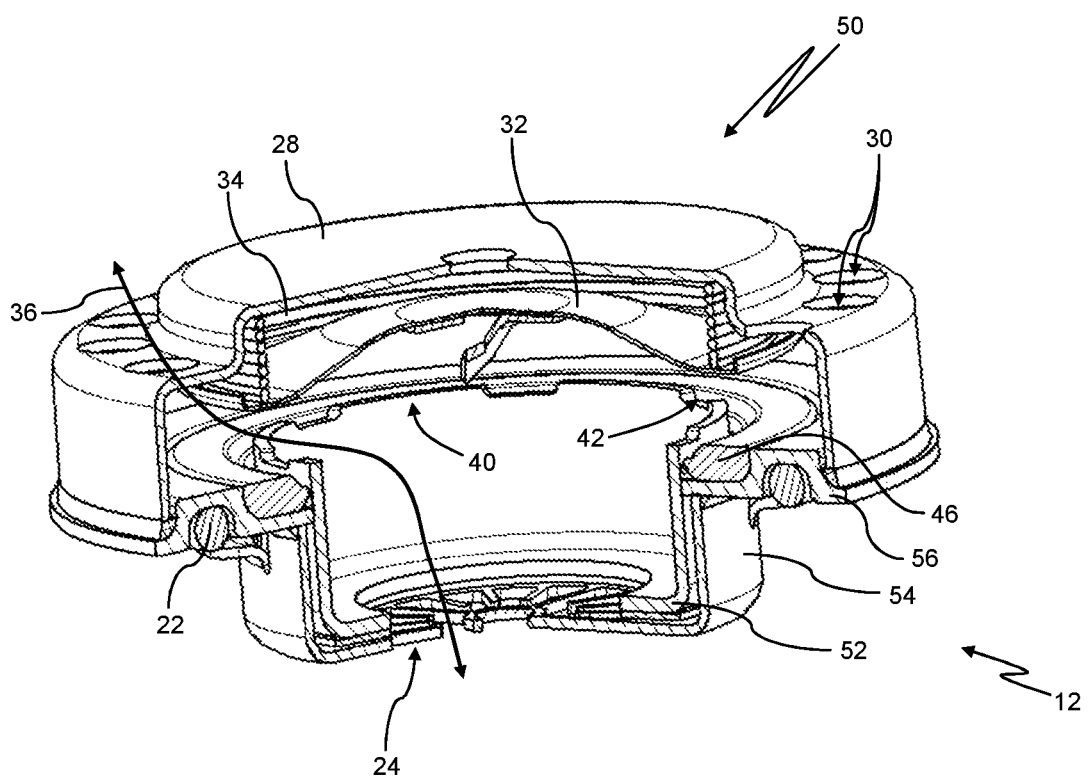
FIG. 6 shows, in a schematic section view, the pressure equalization device of FIG. 5a during an emergency venting process in which outflowing gas lifts the closure element against the action of a spring element off the base body and has inverted the closure element into an emergency operating configuration.

FIG. 6 shows the pressure equalization device 50 during an emergency venting process. Due to the hot gas which is flowing at high pressure and with a large volume flow out of the interior 14 of the housing 18, the closure element 32 has been moved against the effect of the spring element 34 away from the base body 12. In addition, the gas pressure has transferred the closure element 32 into an emergency operating configuration. In the emergency operating configuration, the closure element 32 is curved away from the flow opening 24. In other words, in the illustrated embodiment the closure element 32 can be transferred from the normal operating configuration into the emergency operating configuration by inversion. The closure element 32 can be referred to as a metal snap dome.

Figure 7A:
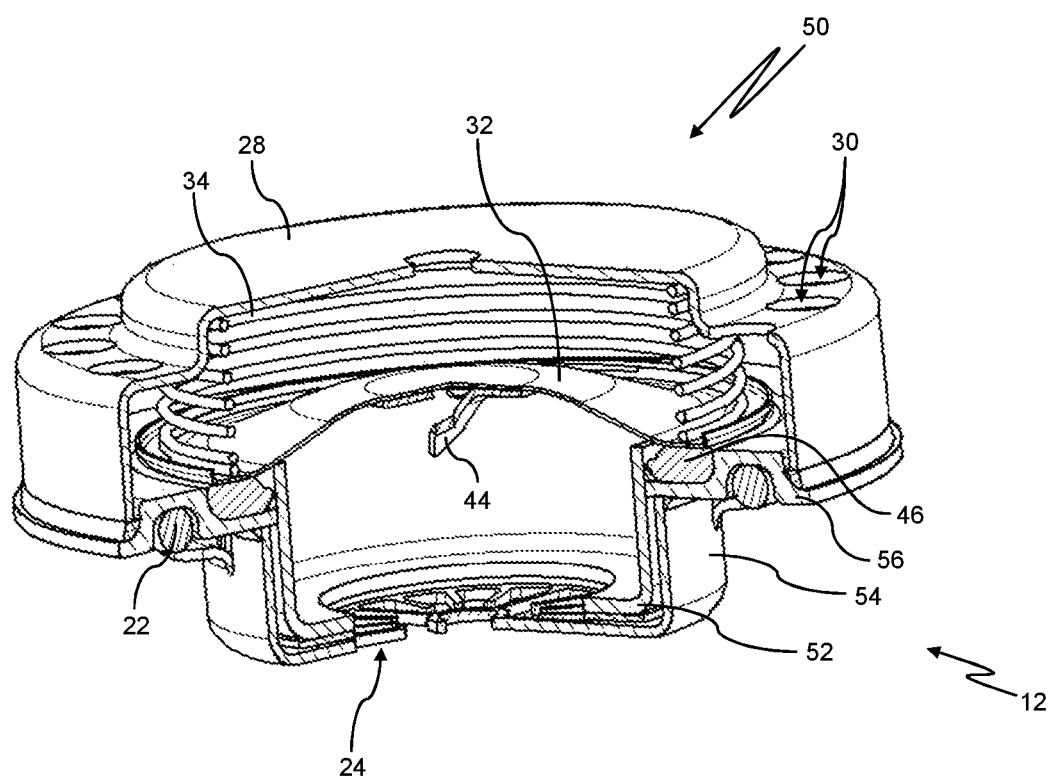
FIG. 7a shows, in a schematic section view, the pressure equalization device of FIG. 5a after completion of the emergency venting process in an emergency operating state, wherein the closure element, which is in the emergency operating configuration, is pressed by the spring element against the base body so that it closes the latter seal-tightly.
Figure 7B:
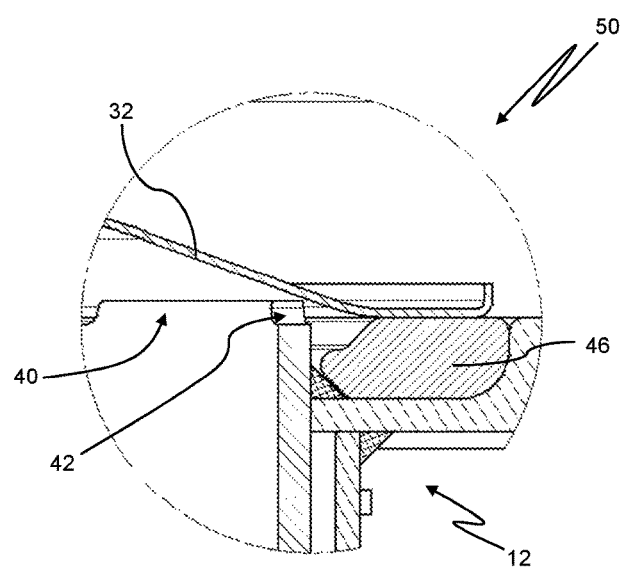
FIG. 7b shows the pressure equalization device of FIG. 7a in an enlarged detail section view.

FIGS. 7a and 7b show the pressure equalization device 50 in the emergency operating state after completion of the emergency venting process. Since the closure element 32 is curved away from the flow opening 24 in the emergency operating configuration, the projections 40 are no longer in contact with the closure element 32. Instead, a radially outer rim of the closure element 32 is pressed continuously circumferentially against the base body 12 by the spring element 34. The base body 12 can comprise a seal element 46 for seal-tight contact of the closure element 32. In the emergency operating state, the closure element 32 closes the base body 12 and thus the pressure equalization device 50.

Figure 8:
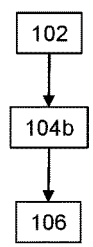

FIG. 8 shows a flowchart of the pressure equalization between the interior 14 and the environment 16 by use of the pressure equalization device 50.

In a step 102, a gas exchange between the interior 14 and the environment 16 takes place in a normal operating state, wherein the gas flows through the flow opening 24 or the membrane 26, through the recesses 42 between the closure element 32 and the base body 12, and through the venting openings 30 in the cover 28 along the flow path 36, compare FIGS. 5a and 5b. In this way, the pressure in the interior 14 of the housing 18 is equalized to the pressure of the environment 16. In this context, the flow can occur temporarily into the housing 18 and out of the housing 18, respectively.

In a step 104b, an emergency venting process is performed. Due to the sudden pressure increase in the interior 14, the membrane 26 is deflected toward the closure element 32 and destroyed by the emergency venting spike 44. Due to the hot gas flowing under high pressure out of the interior 14, the closure element 32 is lifted off the base body 12, compare FIG. 6. Furthermore, the outflowing hot gas transfers the closure element 32 into the emergency operating configuration in that it inverts the closure element 32.

After relief of the excess pressure in the interior 14, the closure element 32 is forced by the spring element 34 against the base body 12. The pressure equalization device 50 or its base body 12 is therefore seal-tightly closed in a step 106, compare FIGS. 7a and 7b, so that the emergency operating state is established. The flow path 36 (compare FIGS. 5a and 5b) is now blocked.

Figure 9:
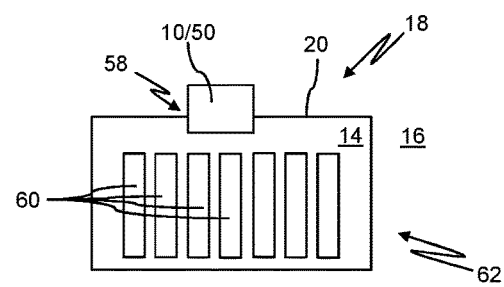
FIG. 9 shows, in a greatly simplified section view, a housing according to the invention with a pressure equalization device according to the invention, wherein in the housing a plurality of battery cells are arranged.

In FIG. 9, the arrangement of the pressure equalization device 10 or 50 in the housing wall 20 of the housing 18 is schematically illustrated. The housing wall 20 comprises a through passage 58 for receiving the pressure equalization device 10 or 50. In the housing 18, electrochemical energy storage cells 60, here lithium-ion cells, are arranged. The overall arrangement of FIG. 9 can therefore also be referred to as a battery 62.

Figure 10:
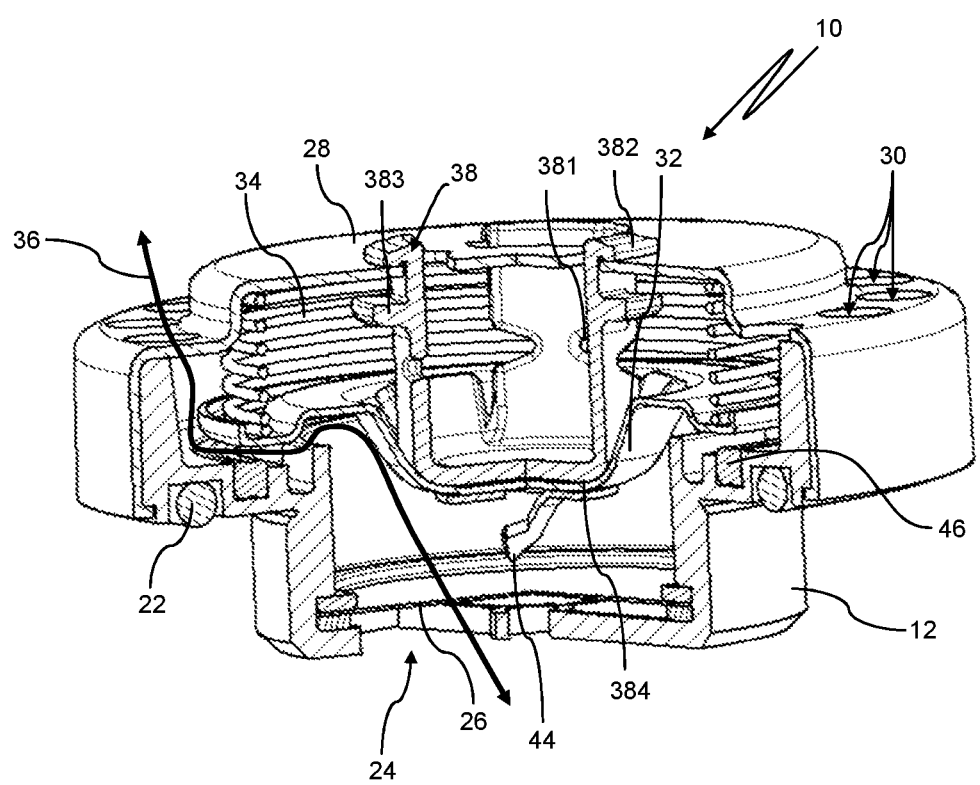
FIG. 10 shows, in a schematic section view, a further pressure equalization device according to the invention with a base body which can be flowed through and against which a closure element is pretensioned, wherein a flow path between the base body and the closure element is open in a normal operating configuration of the closure element.
Figure 12:
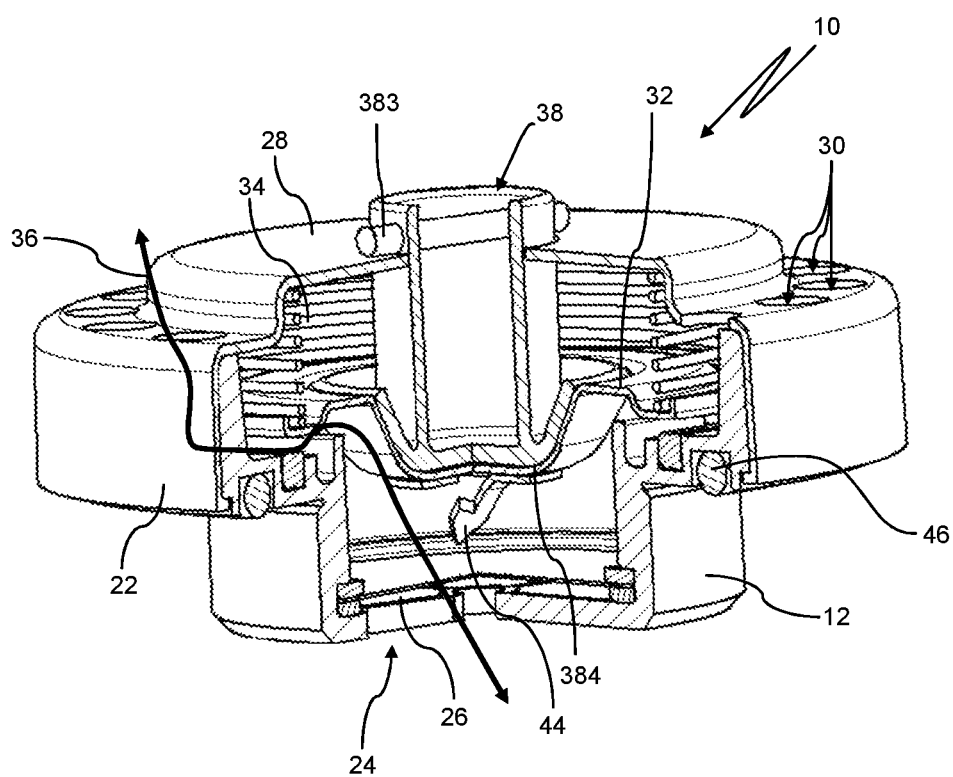
FIG. 12 shows, in a schematic section view, a still further pressure equalization device according to the invention with a base body which can be flowed through and against which a closure element is pretensioned, wherein a flow path between the base body and the closure element is open in a normal operating configuration of the closure element.

In FIG. 10, a still further embodiment of the pressure equalization device 10 according to the invention is illustrated. It differs from the embodiment according to FIG. 1 to FIG. 3b by the different configuration of the spacer 38. The spacer 38 is here provided between the closure element 32 and the cover 28 and is formed as a sleeve-shaped body. The spacer 38 is connected with its closure element end 384 proximal to the closure element 32 to the latter and connected with its end proximal to the cover 28 to the cover 28. The pressure force which is exerted by the spring element 34 on the closure element 32 thus passes through the spacer 38, which is tensile-loaded, into the cover 28. In particular, the spacer 38 comprises, or is comprised of, a plastic material while the closure element 32 is comprised in particular of a metal material. The spacer 38 however can also be comprised of a metal material. The spacer 38 can be connected to the closure element 32, for example, by material fusion or by form fit. Here, particularly gluing, welding under plasma treatment, injection molding as well as screws and/or rivets are conceivable.

At its side which is facing the cover 28, the spacer 38 is connected to the cover 28 by snap hooks 382 which engage in corresponding snap openings of the cover 28. In other embodiments, not illustrated, the spacer however can also be connected to the cover 28 by other connections appearing suitable to a person in the art.

As has already been explained in the context of the first two embodiments, in the normal operating state which is illustrated in FIG. 10, a flow path 36 is released that enables an air exchange through the membrane 26.

When now an emergency venting event occurs, the closure element 32 is suddenly displaced against the spring force so that the maximum possible passage cross section can be made available. Due to the hereby occurring axial pressure forces which act on the spacer 38, the latter is axially entrained also and initially contacts the inner surface of the cover 28 with its radially protruding axial stops 383. As a result, the spacer 38 is structurally destroyed at its appropriately dimensioned rated break points 381, which are present distributed about the circumference, and breaks apart into two pieces, a bottom part facing the closure element 32 and a top part which is facing the cover 28. This process is illustrated in FIGS. 11a and 11b.

After the emergency venting event has passed, the pressure on the closure element 32 decreases again and the closure element 32, driven by the spring force of the spring element 34, is axially moved back so that it contacts the seal element 46 with its circumferentially extending rim and prevents a further gas flow through the flow opening 24.

This embodiment has the advantage that the spacer 38 is present outside of the closure element 32 and thus outside of the flow path 36 so that individual components of the spacer 38 which are produced by the irreversible destruction thereof cannot reach the interior of a housing, in particular battery housing, at which the pressure equalization device is mounted, which interior is freely accessible after the emergency venting event due to the destruction of the membrane 26.

Furthermore, there is the advantage that it is visible from the exterior whether an emergency opening has taken place because, thereafter, the snap hooks 382 of the spacer 38 are no longer present in their original form due to the irreversible destruction.

In FIGS. 12, 13a-c, a further embodiment of the pressure equalization device 10 according to the invention is illustrated which shares structural similarities with the embodiment of FIGS. 10, 11a, 11b, for which reason only the differences will be explained.

The spacer 38 has a sleeve shape and is connected at its closure element end 384 to the closure element 32 and with the other end is held at the cover 28 by the axial stop 383 formed as a pin, wherein the spacer 38 is tensile-loaded in the normal operating state. The axial stop can also be formed in any other way appearing suitable to a person of skill in the art. The connection of the spacer 38 to the closure element 32 at its closure element end 384 is thermally destructible above a predetermined limit temperature, in particular above 200° C., so that it is destroyed in case of an emergency venting event. The connection can be in particular an adhesive connection or other material fusion connection, for example, injection molding of the spacer 38 onto the closure element 28.

Figure 13A:
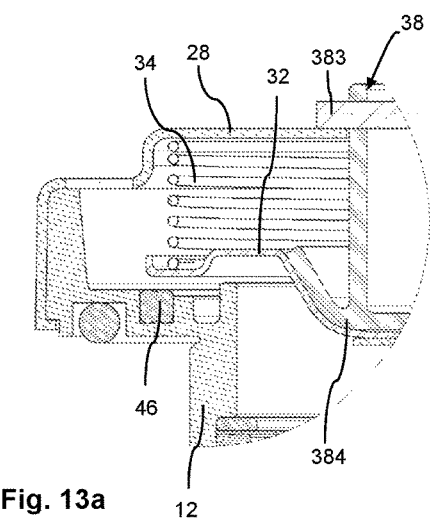
FIG. 13a shows a detail view of the pressure equalization device of FIG. 12 in the normal operating state.
Figure 13B:
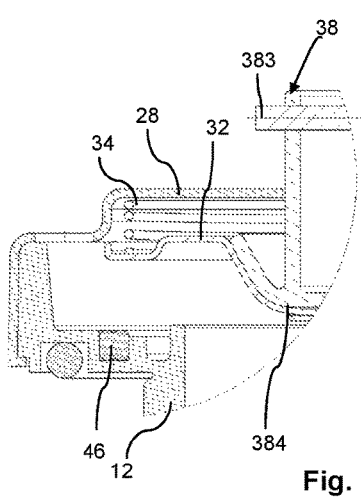
FIG. 13b shows a detail view of the pressure equalization device of FIG. 12 in the emergency venting state.
Figure 13C:
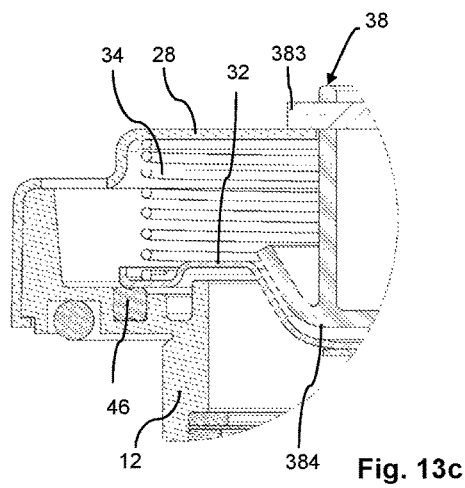
FIG. 13c shows a detail view of the pressure equalization device of FIG. 12 after an emergency venting event.

When an emergency venting event occurs and the pressure equalization device 10 is transferred into the emergency venting state, the closure element 32 is displaced axially and together with it the spacer 38, wherein also the axial stop 383 is lifted off the cover 28. This is illustrated in FIGS. 13a and 13b. Due to the temperatures which are present during the emergency venting process, the connection of the spacer 38 to the closure element 32 at its closure element end 384 is destroyed so that the closure element 32 is axially moved back, driven by the spring force of the spring 34, after completion of the emergency venting process and contacts the circumferentially extending seal 46 of the base body 12.

The invention claimed is:

1. A pressure equalization device for a housing, the pressure equalization device comprising:
    a base body configured to be flowed through;
    a closure element arranged at the base body;
    a flow path provided between the base body and the closure element, the flow path being configured to be open in an emergency venting event of the pressure equalization device;
    a cover;
    a spacer having a first end connected to the cover, and a second end connected to the closure element, a connection of the spacer to the closure element being configured to be destroyed in the emergency venting event of the pressure equalization device; and
    a spring element supported at the cover,
    wherein the pressure equalization device is configured to transition after the emergency venting event into an emergency operating state of the pressure equalization device,
    wherein the spring element is configured to pretension the closure element against the base body in the emergency operating state, and
    wherein the closure element is configured to gas-tightly closes the flow path between the base body and the closure element in the emergency operating state.

2. The pressure equalization device according to claim 1, wherein the connection of the spacer to the closure element is configured to be destroyed above a predetermined limit temperature.

3. The pressure equalization device according to claim 1, wherein the spacer comprises a force transmitting structure extending between the second end and the first end of the spacer, and
    wherein the force transmitting structure comprises one or more rated break points configured to fail at a predetermined pressure load.

4. The pressure equalization device according to claim 3, wherein the force transmitting structure comprises at least one radial protrusion formed as an axial stop, and
    wherein the axial stop is configured to contact an inner surface of the cover in the emergency operating state.

5. The pressure equalization device according to claim 3, wherein the spacer has a sleeve shape, and
    wherein the one or more rated break points are distributed about a circumference of the spacer.

6. The pressure equalization device according to claim 1, wherein the spacer is configured to be axially displaced together with the closure element when the pressure equalization device transitions into the emergency operating state.

7. The pressure equalization device according to claim 1, wherein the spacer comprises a material configured to lose a shape stability at a temperature of at most 250° C.

8. The pressure equalization device according to claim 1, wherein the closure element comprises a bistable spring body.

9. The pressure equalization device according to claim 1, wherein the closure element is configured to, in the emergency operating state of the pressure equalization device, contact continuously and circumferentially the base body.

10. The pressure equalization device according to claim 9, wherein the base body comprises a seal element, and
    wherein the closure element is configured to, in the emergency operating state of the pressure equalization device, contact continuously and circumferentially the seal element.

11. A housing comprising the pressure equalization device according to claim 1.

12. The pressure equalization device according to claim 1, further comprising:
    a flow opening arranged in the flow path in the base body; and
    a membrane arranged in the base body and spanning the flow opening.

13. The pressure equalization device according to claim 12, further comprising an emergency venting spike projecting from the closure element toward the membrane and configured to destroy the membrane deflecting toward and pressing against the emergency venting spike in the emergency venting event.

* * * * *